Figure 1:
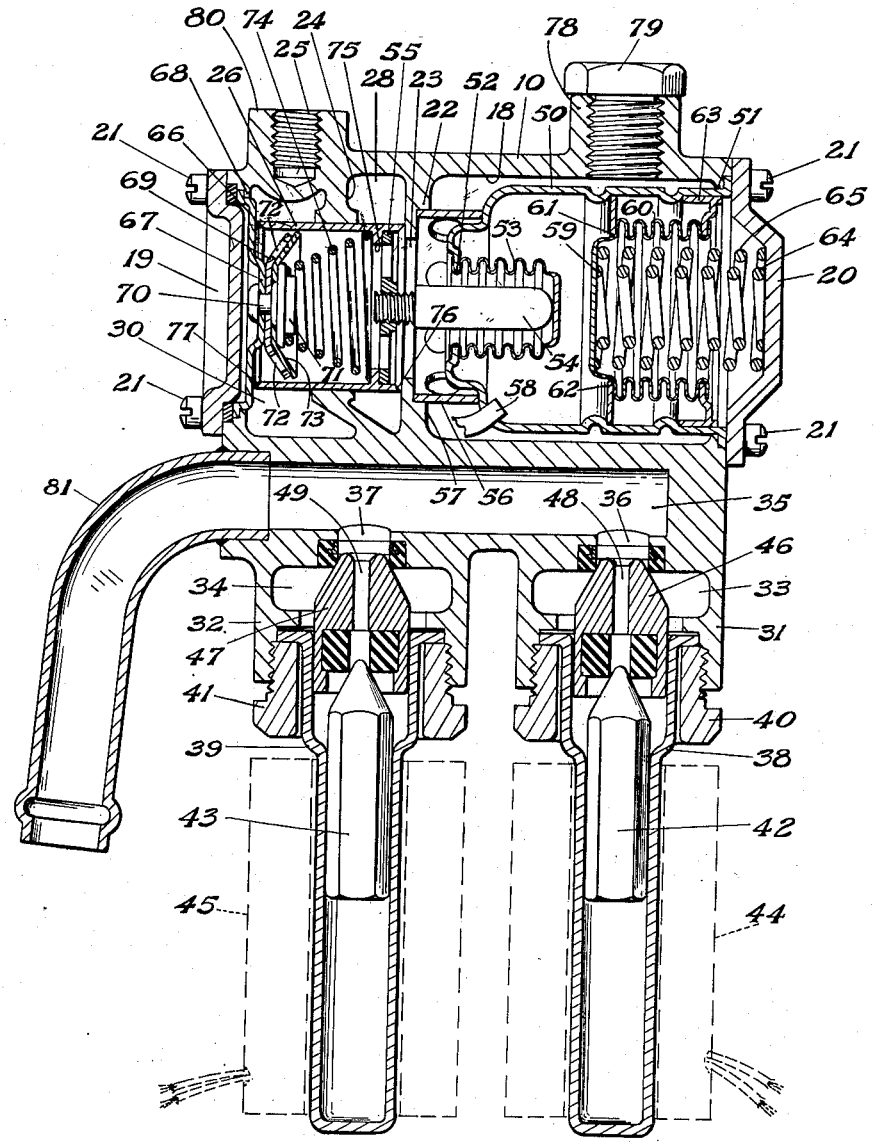

March 16, 1954

C. D. BRANSON 2,672,157

CHECK VALVE STRUCTURE FOR MIXING VALVES

Filed June 8, 1950

2 Sheets-Sheet 1

INVENTOR
Charles D. Branson

BY Albert J. Henderson

ATTORNEY.

March 16, 1954  C. D. BRANSON  2,672,157
CHECK VALVE STRUCTURE FOR MIXING VALVES
Filed June 8, 1950
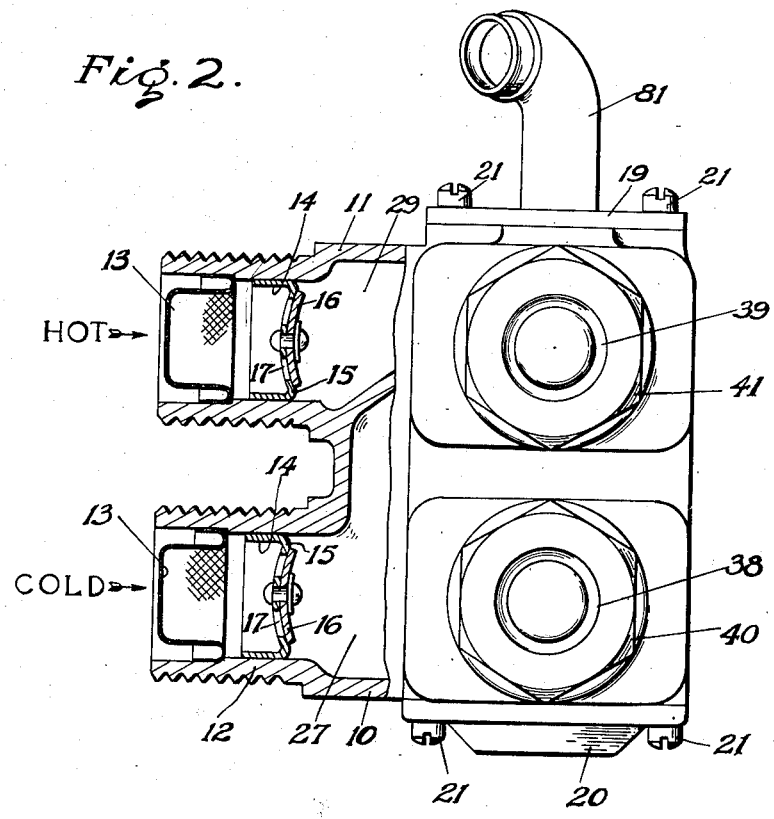
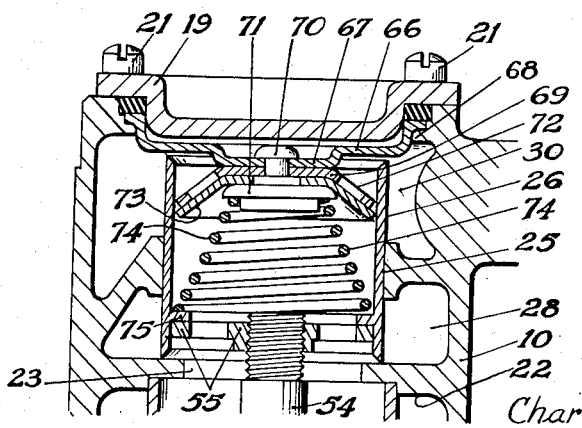
INVENTOR
Charles D. Branson.
BY Albert J. Henderson
ATTORNEY Patented Mar. 16, 1954

2,672,157

UNITED STATES PATENT OFFICE 2,672,157

CHECK VALVE STRUCTURE FOR MIXING VALVES

Charles D. Branson, Knoxville, Tenn., assignor to Robertshaw-Fulton Controls Company, Greensburg, Pa., a corporation of Delaware Application June 8, 1950, Serial No. 166,836

3 Claims. (Cl. 137—607)

This invention relates to check valve structures for mixing valves and more particularly to such structures for preventing one of the fluids entering such mixing valves from passing into the supply system for the other fluid.

In my copending application Serial No. 31,521, filed June 7, 1948, now abandoned, for "Mixing Valves," I have described a novel mixing valve structure which is thermostatically controlled for mixing hot and cold waters to supply a mixed water of desired temperature to equipment utilizing the same such as washing machines. The mixing valve of this application includes solenoid actuated valves which are energized in timed relationship during the cycle of the washing machine to admit either mixed water to the washing machine or to admit hot water thereto. The valve structure disclosed therein includes a ball type check valve to prevent cold water from entering the hot water line should the hot water fail for any reason with the mixing valve in intermediate position.

The ball check valve disclosed in my copending application functions in a satisfactory manner but has the disadvantage of chattering. The novel check valve structure of the present invention is designed to overcome the disadvantages of known check valve structures when employed in mixing valves of this type and provides a novel and simple structure of positive action which is quiet in operation.

In the present invention a hollow valve structure is employed which reciprocates between the hot and the cold water valve seats to control the volumes of hot and cold water admitted to the mixing chamber and the novel check valve of the present invention is mounted within this hollow valve member.

It is accordingly an object of the present invention to provide a novel check valve structure for use in mixing valves which is of simple construction, of positive action, and which is quiet in operation.

Another object is to provide such a mixing valve structure which is mounted within a hollow valve member which is thermostatically positioned to proportion the amounts of hot and cold water admitted to the mixing chamber.

Other and further objects of the present invention will appear from the following description.

The novel check valve structure of my invention is capable of various mechanical embodiments one of which is disclosed in the accompanying drawings and is described hereinafter for the purposes of illustration. This illustrative embodiment of my invention should in no way be construed as defining or limiting the same and reference should be had to the appended claims for this purpose.

In the accompanying drawings, in which like reference characters indicate like parts, an illustrative embodiment of my novel check valve structure is there shown incorporated in a thermostatically controlled mixing valve of the general type described in my copending application identified above.

Fig. 1 of these drawings is a cross sectional view through the entire mixing valve structure showing the general relationship of the several elements thereof including the thermostatically actuated mixing valve with the check valve mounted therein and the solenoid actuated valves for controlling the admission of hot water or of mixed water to the utilizing equipment;

Fig. 2 is a view partly in section of the embodiment of Fig. 1 as seen from the left in Fig. 1 showing in section the hot and cold water inlets for the mixing valve; and Fig. 3 is an enlarged detail of a part of the embodiment of Fig. 1 showing the check valve structure.

Referring now to the several figures, 10 designates a housing of any suitable size, construction and material provided with a pair of nipples 11 and 12 here shown as externally threaded to receive any suitable connections leading from hot and cold water lines respectively. Strainers 13 of any suitable construction may be mounted in said inlet nipples 11 and 12 as illustrated. Check valves 14 may also be mounted within nipples 11 and 12 and these check valves comprise a spider 15 upon which is secured a suitable resilient member 16 to close the openings 17 in spider 15 on failure of either the hot or cold water supply.

Housing 10 is provided with an internal chamber 18 which passes completely through the housing and is closed at opposite ends by end members 19 and 20 suitably secured to housing 10 by bolts 21. Chamber 18 is provided with an internal partition 22 which is cut away axially of chamber 18 to provide a central opening 23. Chamber 18 is provided with a second internal partition 24 which is cut away axially of chamber 18 to provide an opening 25 and the surface of opening 25 provides a guide for the hollow valve element 26 which is preferably of cylindrical shape.

Cold water nipple 12 opens into a suitable chamber 27 formed in housing 10 and chamber 27 in turn communicates with that portion of chamber 18 coming between partitions 22 and 24 and shown at 28.

Hot water nipple 11 opens into a suitable chamber 29 formed in housing 10 which communicates with that portion of chamber 18 coming between partition 24 and end 19 and shown at 30.

Housing 10 is provided with a second pair of internally threaded nipples 31 and 32 to receive solenoid actuated valves of any suitable type. Nipple 31 is provided with an internal chamber 33 which communicates with chamber 18 between partition 22 and end 20. Nipple 32 is provided with an internal chamber 34 which communicates with chamber 30. A passage 35 is provided in housing 10 and communicates with chamber 33 through opening 36 and communicates with chamber 34 through opening 37.

The solenoid actuated valves utilized with the mixing valve structure disclosed in Fig. 1 are in every way identical to those disclosed and described in my copending application identified above and include tubular members 38 and 39 secured within nipples 31 and 32 by thimbles 40 and 41. Solenoid valve members 42 and 43 are mounted for reciprocating movement within tubular members 38 and 39. Movement of members 42 and 43 is obtained by magnetic coils 44 and 45 surrounding tubular members 38 and 39 respectively. Floating valve members 46 and 47 close openings 36 and 37 respectively and are axially bored at 48 and 49 respectively. Passages 48 and 49 are closed by members 42 and 43 respectively.

A generally cylindrical housing 50 is mounted in and suitably spaced from chamber 18 and is secured in place by clamping engagement between end member 20 and a suitable shoulder 51 formed within chamber 18. Housing 50 is circularly cut away at 52 and a suitable expansible and contractible corrugated resilient metallic chamber or bellows 53 is mounted within and closes opening 52. A suitable connecting rod 54 is carried within bellows 53 and is suitably secured to spider 55 which is secured adjacent and within the near end of valve member 26. A perforated spacing collar 56 is mounted between housing 50 and partition 22 and is held in place by shoulder 57 formed in partition 22. Housing 50 is filled with a thermosensitive fluid and changes in volume of this fluid change the position of bellows 53 and reciprocate valve member 26 through connecting rod 54. Thermosensitive liquid is supplied to housing 50 through filler tube 58.

A cushion or over-run device may be provided within housing 50 to protect bellows 53 upon abnormal expansion of the thermosensitive liquid in housing 50. This cushion includes a movable partition 59 forming the closed end of a suitable resilient corrugated expansible and collapsible metallic chamber or bellows 60 cooperating with a partition 61 mounted within chamber 50 and having an aperture 62 formed therein. Bellows 60 is held in place by a thimble 63 sealed in housing 50 to which bellows 60 is sealed. Springs 64 and 65 are mounted between end 20 and partition 59 and urge partition 59 into closing relationship with respect to aperture 62.

As noted above, the check valve assembly is mounted within the hollow valve element 26. A plate 66 having a raised boss 67 is held in place in chamber 30 by clamping engagement between end 19 and a suitable shoulder 68 formed within housing 10. A cup-shaped stationary valve member 69 fitting loosely in valve member 26 is secured to boss 67 by rivet 70. The head 71 of rivet 70 is shaped to provide a spring seat. Cup-shaped member 69 is provided with a plurality of openings 72 therein. A resilient valve element 73 covers openings 72 and engages the inner walls of valve member 26 and is secured between valve member 69 and head 71. A suitable conical spring 74 engages head 71 and a suitable shoulder 75 is formed within valve member 26.

The end of valve member 26 which is adjacent to partition 22 is internally beveled at 76 so that a watertight seat may be made by engagement with partition 22. The end of valve element 26 which is adjacent to plate 66 is internally beveled at 77 to form a watertight seat by engagement with plate 66.

Housing 10 may be provided with a drainage opening 78 closed by a suitable plug 79 and may also be provided with an internally threaded nipple 80 to provide a means for mounting the valve housing 10 on any suitable structure. Passage 35 may be continued by any suitable tubular extension 81.

The operation of the mixing valve of the present invention is similar to that described in my copending application identified above. When hot water only is desired at the washing machine the coil 45 is energized withdrawing solenoid member 43 from aperture 49. This unbalances the pressures acting on valve member 47 and the same is forced downwardly as seen in Fig. 1 opening port 37. Hot water then flows through nipple 11 and chamber 29 into chamber 30 and into chamber 34. From chamber 34 the hot water flows through orifice 37 and out to passage 35 and pipe 81 to the washing machine. During this flow of hot water cold water is prevented from entering chamber 30 should valve member 26 be unseated at partition 22 by the cold water pressure holding resilient member 73 against cup-shaped member 69, thus closing ports 72, and against the inner surface of valve member 26 so that cold water cannot pass around the periphery of cup-shaped member 69.

When mixed water is desired at the washing machine coil 45 is de-energized and solenoid member 43 closes aperture 49. Unequal pressures are then established on valve member 47 and the same is moved upwardly as seen in Fig. 1 closing port 37. Coil 44 is then energized and solenoid 42 is moved downwardly as seen in Fig. 1 opening aperture 48 and establishing a pressure differential on member 46 which moves the same downwardly as seen in Fig. 1 opening port 36. Water then flows from the portion of chamber 18 surrounding housing 50. The temperature of the water flowing over housing 50 is transmitted to the thermosensitive liquid therein and changes in this temperature are reflected in changes in the volume of the thermosensitive liquid.

If the temperature of the liquid flowing around housing 50 falls, the volume of the thermosensitive liquid is reduced allowing bellows 53 to expand, assisted by spring 74. Valve member 26 is moved toward partition 22 thus reducing the size of the cold water inlet and increasing the size of the hot water inlet. An increased volume of hot water then flows around the left-hand end of valve 26 over plate 66 into valve 26 and flows through apertures 72 forcing resilient elements 73 away from cup-shaped member 69 and away from the side walls of valve 26. Valve element 26 is therefore free to move without interference by resilient element 73.

The hot water flowing in valve 26 is mixed with cold water admitted from chamber 28 between the right-hand end of valve 26 and partition 22. This mixed water will have an increased temperature because of the increased volume of hot water and this increase in temperature will expand the thermosensitive liquid in housing 50 causing bellows 53 to contract moving valve element 26 against the action of spring 74 to bring the mixed water temperature to the temperature for which the valve is preset.

Should the hot water fail at any time during the period when the mixed water solenoid valve is open and valve member 26 is unseated at partition 22, cold water is prevented from flowing from chamber 28 into the hot water chamber 30 and into the hot water line through nipple 11 by resilient element 73 which is forced by the cold water pressure against cup-shaped member 69 to close opening 72 and is forced into engagement with the inner wall of valve 26 to prevent flow around the outer periphery of cup-shaped member 69.

The safety feature provided by bellows 60 is utilized when, for any reason, the temperature of the water surrounding housing 50 continues to rise even though bellows 53 has moved valve element 26 into seating engagement with plate 66. Such further increases in temperature with corresponding increases in volume of the thermosensitive liquid might damage bellows 53. As the volume of the thermosensitive liquid in chamber 50 continues to increase partition 59 will be moved to the right against the action of springs 64 and 65 compressing bellows 60 to increase the effective internal volume of chamber 50 to prevent damage to the bellows 53.

It will now be apparent that by the present invention I have provided a novel check valve structure for use in thermostatically controlled mixing valves which is mounted within the mixing valve element controlling the flow of hot and cold fluids and which in every way satisfies the objects described above.

Changes in or modifications to the above described illustrative embodiment of my novel mixing valve may now be suggested to those skilled in the art without departing from my inventive concept and reference should be had to the appended claims to determine the scope of my invention.

What I claim is:

1. In a mixing valve for fluids of different temperatures, the combination of a casing having inlet passages for different temperature fluids, a mixing chamber and an outlet for a mixture of said fluids, a hollow partition in said casing for separating said passages, a hollow valve member having an inner wall defining a passage therethrough and reciprocable in said partition, valve seat means carried by said casing at either end of said valve member and cooperable therewith for controlling the flow from said passages to said mixing chamber, said hollow valve member defining a conduit communicating with one of said seat means and said chamber, and check valve means operable within said hollow valve member to limit said flow to one direction therethrough, said check valve means including a perforated member mounted on said casing and extending wthin one end of said hollow valve member, and resilient means carried by said perforated member in overlying relation therewith and adapted for sealing contact with said inner wall of said hollow valve member.

2. In a mixing valve as claimed in claim 1 including a spring operable between said perforated member and said hollow valve member for biasing the latter in said one direction.

3. In a mixing valve for fluids of different temperatures, the combination of a casing having inlet passages for different temperature fluids, a mixing chamber and an outlet for a mixture of said fluids, a hollow partition in said casing for separating said passages, a hollow valve member having an inner wall defining a passage therethrough and reciprocable in said partition, valve seat means carried by said casing at either end of said valve member and cooperable therewith for controlling the flow from said passages to said mixing chamber, said hollow valve member defining a conduit communicating with one of said seat means and said chamber, and check valve means operable within said hollow valve member to limit said flow to one direction therethrough, said check valve means including a movable valve element carried by said casing and engageable in fluid sealing relation with said inner wall of said hollow valve member.

CHARLES D. BRANSON.

References Cited in the file of this patent

UNITED STATES PATENTS

| Number | Name | Date |
|---|---|---|
| 1,176,212 | Fulton | Mar. 21, 1916 |
| 2,205,334 | Barnes | June 18, 1940 |
| 2,423,281 | Aspelin | July 1, 1947 |
| 2,526,099 | Vinson | Oct. 17, 1950 |
| 2,558,161 | Thoren | June 26, 1951 |

FOREIGN PATENTS

| Number | Country | Date |
|---|---|---|
| 505,916 | Great Britain | May 19, 1939 |